UNITED STATES PATENT OFFICE.

WALTER P. SCHUCK, OF PORTLAND, OREGON, ASSIGNOR TO SUPERIOR OIL AND PROCESS COMPANY, OF PORTLAND, OREGON, A CORPORATION.

PROCESS OF TREATING SOLID FATTY MATERIALS.

1,288,228.  Specification of Letters Patent.  Patented Dec. 17, 1918.

No Drawing.    Application filed January 9, 1917. Serial No. 141,436.

*To all whom it may concern:*

Be it known that I, WALTER P. SCHUCK, a citizen of the United States, residing at Portland, in the county of Multnomah and State of Oregon, have invented certain new and useful Improvements in Processes of Treating Solid Fatty Materials, of which the following is a specification.

The present invention relates to the separation from solid fatty materials of liquid fats or oils, by methods involving the pressing of the said material. As an example of the present invention, I cite the separation of the liquid oily portion from the solid portion of cocoanut oil.

In the treatment of cocoanut oil as at present employed, it has been customary to cast the cocoanut oil into cakes, which are then cooled and solidified and are separately wrapped in press cloths and then pressed in a hydraulic or other press, until practically all of the liquid material has been squeezed out, leaving a more or less pure stearin in the cloths. While being pressed very great care must be taken in the pressing operation to apply the pressure very gradually to expel all of the liquid oil, and in ordinary practice a considerable amount of the solid fat may be forced out through the pores of the cloths, together with the liquid oil. Even when carefully done, there is a tendency for the solid fat to clog the pores of the cloth and thereby hinder the liquid oil from passing through. Also some particles of the liquid oil contained in the interior of the cakes are hindered and prevented from passing upwardly, by the layers of hard solid fat adjacent the filter cloth.

I have now found that the pressing operation can be materially aided, and expedited, by the addition of about 5% of cellulose fiber to the cocoanut oil, before solidifying, after which the oil is thoroughly agitated to disseminate the fibers throughout its mass, and then cooled to produce a cake, which can then be wrapped in filter cloths and pressed in about one-third of the time necessary for a cake without the added fiber. In the choice of a suitable fiber to employ, it is preferable to select one which is hollow, such as the flax fiber above referred to, which can, on account of being hollow, act on the same principle as a drain tile, but I do not limit myself necessarily to a hollow cellulose fiber.

After the cakes containing the cellulose fiber have been wrapped as above indicated, they are then built up upon the press in the usual or any preferred manner, and preferably heated to a temperature slightly below the melting point of the stearin; in practice it being preferred to use the highest temperature at which the stearin will remain solid. Pressure is then applied in the usual manner, and the liquid oil will be expressed in not only a very much shorter time than when the fiber is omitted, but also much more completely. After the pressing operation has been carried out to the desired extent, the cakes are melted, and the fiber separated from the oil by running through a centrifuge or strainer.

I desire it to be understood that while I have referred to the separation of stearin from cocoanut oil, the invention is not limited thereto, but to any case where it is desired to separate by pressing a solid fat-like body from a liquid oily body. The invention is not only applicable to the separation of solid fats such as stearin, but also solid fat-like bodies such as paraffin.

What I claim is:

1. A process of separating liquid oily material from solid fatty material which comprises pressing a mixture comprising such materials containing added fibers disseminated therethrough.

2. A process of separating liquid oily material from solid fatty material which comprises pressing a mixture comprising such materials containing about 5% of hollow or tubular fibers disseminated therethrough.

3. A process which comprises mixing a small quantity of fibers with a mixture of normally hard fat and normally liquid oil, molding the same into cakes, incasing the cakes in cloths, and thereafter pressing the cakes in the cloths while at a temperature slightly below the melting point of the said hard fat.

4. A process which comprises mixing about 5% of flax fibers with a mixture of normally hard fat and normally liquid oil, molding the same into cakes, incasing the cakes in cloths, and thereafter pressing the cakes in the cloths while at a temperature slightly below the melting point of the said hard fat.

5. A process of removing liquid oil from cocoanut oil containing solid fat and containing liquid oil, which comprises mixing with the said cocoanut oil while in a liquid state, a relatively small percentage of hollow or tubular fibers, solidifying the mass in the form of cakes, wrapping said cakes in filter cloths, pressing the said cakes at a temperature only slightly below the melting point sufficiently to expel a material proportion of the liquid oil, thereafter melting the cakes and separating the fibers therefrom.

6. A process of treating a material which is normally solid but which consists essentially of a mixture of normally solid fat-like material and normally liquid oil, which comprises adding to such material, while in a molten condition, a relatively small percentage of fibrous material consisting essentially of hollow fibers, mixing the mass, solidifying the mass in the form of cakes, wrapping said cakes in filter cloths, pressing the said cakes at a temperature only slightly below the melting point sufficiently to expel a material proportion of the liquid oil, thereafter melting the cakes and separating the fibers therefrom.

In testimony whereof I affix my signature.

WALTER P. SCHUCK.